United States Patent
Kramer et al.

(10) Patent No.: US 12,157,707 B2
(45) Date of Patent: Dec. 3, 2024

(54) CURABLE COMPOSITION FOR ALKALINE SUBSTRATES

(71) Applicant: SIKA TECHNOLOGY AG, Baar (CH)

(72) Inventors: Andreas Kramer, Zurich (CH); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 234 days.

(21) Appl. No.: 17/292,137

(22) PCT Filed: Nov. 11, 2019

(86) PCT No.: PCT/EP2019/080850
§ 371 (c)(1),
(2) Date: May 7, 2021

(87) PCT Pub. No.: WO2020/099309
PCT Pub. Date: May 22, 2020

(65) Prior Publication Data
US 2021/0395155 A1    Dec. 23, 2021

(30) Foreign Application Priority Data
Nov. 14, 2018  (EP) ..................... 18206320

(51) Int. Cl.
| | |
|---|---|
| C04B 41/48 | (2006.01) |
| B32B 3/14 | (2006.01) |
| B32B 7/12 | (2006.01) |
| B32B 13/04 | (2006.01) |
| C04B 41/00 | (2006.01) |
| C04B 41/63 | (2006.01) |
| C08G 18/48 | (2006.01) |
| C08G 18/76 | (2006.01) |
| C04B 111/60 | (2006.01) |

(52) U.S. Cl.
CPC ............ *C04B 41/4896* (2013.01); *B32B 3/14* (2013.01); *B32B 7/12* (2013.01); *B32B 13/04* (2013.01); *C04B 41/009* (2013.01); *C04B 41/4884* (2013.01); *C04B 41/63* (2013.01); *C08G 18/4812* (2013.01); *C08G 18/7621* (2013.01); *C04B 2111/60* (2013.01)

(58) Field of Classification Search
CPC ............ C04B 41/4578; C04B 41/4884; C04B 41/4896
See application file for complete search history.

(56) References Cited

U.S. PATENT DOCUMENTS

| | | | | |
|---|---|---|---|---|
| 3,663,487 A * | 5/1972 | Broecker | ........... | C08G 18/0823 528/111.5 |
| 4,627,929 A * | 12/1986 | Buysch | ............... | C10M 151/04 508/296 |
| 5,236,994 A * | 8/1993 | Markusch | .......... | C08G 18/8041 428/425.5 |
| 8,178,167 B2 * | 5/2012 | Walther | ................ | C08G 18/12 427/385.5 |
| 8,389,772 B2 * | 3/2013 | Burckhardt | .......... | C08G 18/503 428/221 |
| 2002/0103289 A1 * | 8/2002 | Sawitski, Jr. | ...... | C08G 18/4841 524/589 |
| 2010/0285311 A1 | 11/2010 | Steidl et al. | | |
| 2016/0096976 A1 * | 4/2016 | Yoshino | .............. | C08G 18/324 524/873 |

FOREIGN PATENT DOCUMENTS

| | | |
|---|---|---|
| CN | 106279668 A | 1/2017 |
| DE | 102006015774 A1 | 10/2007 |
| DE | 102011109541 A1 | 2/2013 |
| EP | 2145909 A1 | 1/2010 |
| EP | 2567999 A1 | 3/2013 |
| EP | 3037450 A1 | 6/2016 |
| JP | 2005-344035 A | 12/2005 |
| JP | 2007-231071 A | 9/2007 |
| JP | 2010-1707 A | 1/2010 |
| JP | 2014-507503 A | 3/2014 |
| JP | 2014-227522 A | 12/2014 |
| JP | 2015-137359 A | 7/2015 |
| JP | 2018-62827 A | 4/2018 |
| WO | 2011/132551 A1 | 10/2011 |

OTHER PUBLICATIONS

Yuan, Liemei, et al. "Synthesis of oxazolidines as latent curing agents for single-component polyurethane adhesive and its properties study." Journal of Applied Polymer Science, vol. 135, No. 4, 2018, p. 45722.

Jan. 21, 2020 International Search Report issued in International Patent Application No. PCT/EP2019/080850.

Jan. 21, 2020 Written Opinion of the International Searching Authority issued in International Patent Application No. PCT/EP2019/080850.

May 18, 2021 International Preliminary Report on Patentability issued in International Patent Application No. PCT/EP2019/080850.

* cited by examiner

*Primary Examiner* — Michael M Dollinger
(74) *Attorney, Agent, or Firm* — Oliff PLC

(57) ABSTRACT

Methods of using a curable composition, the curable composition including at least one polyether having blocked hydroxyl groups as the plasticizer on at least one alkaline substrate. The curable composition is storage-stable, easy to handle and highly elastic after curing, and does not show any tendency to separate or migrate. It enables elastic bonding, sealing or coating of alkaline substrates, such as, in particular, fresh or green concrete or cement mortar, without occurrence of troublesome odors triggered by plasticizer hydrolysis.

13 Claims, No Drawings

CURABLE COMPOSITION FOR ALKALINE SUBSTRATES

TECHNICAL FIELD

The invention relates to curable compositions based on polyurethane or SMP that are suitable for use in alkaline substrates such as, in particular, fresh (green) concrete or cement mortar, especially as adhesive, sealant or coating.

STATE OF THE ART

Curable compositions based on polyurethanes or silane-modified polymers (SMP) are often used as adhesives, sealants or coatings in the construction sector. Typical substrates for the application of such products originate from cement-, lime- or silicate-bound building materials such as concrete or cement mortar. When these building materials have only recently been processed and the substrates in the form of foundations, walls, screeds, renders etc. are thus still fresh, they have a markedly alkaline surface with pH values of 10 or higher, since the hydroxides present therein have not yet been carbonated. Fresh concrete is also referred to as "young" or "green" or "wet". In order to protect the curable composition from contact with the alkaline surface, it can be left to age sufficiently or else pretreated prior to the application of the composition, for example by neutralization by means of a fluate, for example a fluoridosilicate, or by sealing by means of a primer, for example an epoxy resin coating. In practice, however, this is frequently not done in order to save time and money. In the boundary layer, hydrolysis reactions of constituents of the curable composition can occur under the alkaline conditions, which can result in troublesome odor emissions. Among the sensitive compounds are in particular the plasticizers that are present in most compositions of this kind, which are typically fatty alcohol dicarboxylic esters such as diisodecyl phthalate (DIDP), diisononyl cyclohexane-1,2-dicarboxylate (DINCH) or di(2-ethylhexyl) adipate (DOA). Hydrolysis thereof leads to release of the fatty alcohols, which have a highly unpleasant smell and migrate into the pore structure of the substrates and thence evaporate or are washed out into the environment and cause a musty odor over a long period of time. Such long-lasting odor nuisance is observed particularly in the case of bonding of parquet on fresh cement screed by means of elastic polyurethane or SMP adhesives.

SUMMARY OF THE INVENTION

It is therefore an object of the present invention to provide a curable composition for use in alkaline substrates which is suitable as adhesive, sealant or coating in the construction sector, and which overcomes the disadvantages of the prior art. This object is achieved by the curable composition as described in claim 1. The curable composition comprises at least one polyether having blocked hydroxyl groups as plasticizer. The latter is preparable from readily obtainable commodities in a simple method, has good compatibility in the composition, has high elastifying action and, in the event of any hydrolysis reactions on the alkaline substrate, releases the parent hydroxy-functional polyether which is odor-neutral and does not exert any further troublesome effects. The polyether having blocked hydroxyl groups promotes good storage stability and processibility of the curable composition and does not have a tendency to migrate or separate, meaning that it does not cause any sticky surfaces or formation of spots on the substrates. The curable composition is storage-stable, easy to handle and highly elastic after curing, and does not show any tendency to separate or migrate. It enables elastic bonding, sealing or coating of alkaline substrates, such as, in particular, fresh or green concrete or cement mortar, without occurrence of troublesome odors triggered by plasticizer hydrolysis.

It is thus possible by the use of the invention to also reliably and permanently bond or seal or coat substrates having highly alkaline surfaces, in which case the adhesive bond obtained does not cause any troublesome odor emissions and is very resistant to migration effects.

Further aspects of the invention are the subject of further independent claims. Particularly preferred embodiments of the invention are the subject of the dependent claims.

WAYS OF EXECUTING THE INVENTION

The present invention provides for the use of a curable composition comprising at least one polyether having blocked hydroxyl groups as plasticizer on at least one alkaline substrate having a pH of at least 10 when wetted with water.

A "curable composition" refers to a composition containing polymerizable macromolecules, which, through cross-linking reactions of its reactive groups, can cure or attain a state of elevated mechanical strength.

"Polyether" refers to a molecule or a group of oligomeric and/or polymeric molecules that consist mainly of repeat alkyleneoxy units.

A "blocked hydroxyl group" refers to a hydroxyl group converted by chemical reaction to a group unreactive toward isocyanate groups.

"Plasticizer" refers to nonvolatile substances that are not chemically incorporated into the polymer in the course of curing and exert a plasticizing effect on the cured polymer.

A "silane group" refers to a silyl group bonded to an organic radical and having one to three, especially two or three, hydrolyzable alkoxy radicals on the silicon atom.

"Silane" refers both to organoalkoxysilanes bearing one to three organic substituents on each silane group and tetraalkoxysilanes. Silanes that bear one or more hydroxyl, isocyanato, amino or mercapto groups in addition to the silane group on an organic radical are referred to as "hydroxysilane", "isocyanatosilane", "aminosilane" and "mercaptosilane" respectively.

Substance names beginning with "poly", such as polyamine, polyol or polyisocyanate, refer to substances containing, in a formal sense, two or more of the functional groups that occur in their name per molecule.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

A curable composition referred to as "storage-stable" or "storable" is one that can be stored at room temperature in a suitable container over a prolonged period, typically over at least 3 months up to 6 months or more, without this storage resulting in any change in its application or use properties to an extent relevant to its use.

"Room temperature" refers to a temperature of 23° C.

More particularly, the pH of the water-wetted alkaline substrate is determined with pH indicator paper.

The alkaline substrate is preferably a fresh, as yet incompletely carbonated substrate based on cement, lime (calcium hydroxide) and/or silicate (waterglass).

More preferably, the alkaline substrate is a fresh concrete, fresh cement mortar, fresh lime mortar or a fresh lime or silicate paint.

A concrete is referred to as "fresh" for as long as it still gives an alkaline reaction with a pH of 10 or more. The period of time during which a concrete is still fresh depends on its setting time and the ambient temperature. The period of time typically varies within the range from 1 to 10 days. Fresh concrete is also referred to as "young" or "green" or "wet".

The curable composition comprises at least one polyether having blocked hydroxyl groups as plasticizer.

The polyether having blocked hydroxyl groups is essentially free of unblocked hydroxyl groups. What is meant here by "essentially free of" is that 95%, preferably 99%, especially 99.9%, most preferably 100%, of the hydroxyl groups present are blocked.

The polyether having blocked hydroxyl groups is present as plasticizer in the curable composition. It is accordingly preferably free of reactive groups that enter into crosslinking reactions with moisture or with ingredients present in the composition. It is especially free of isocyanate groups and silane groups.

The polyether having blocked hydroxyl groups is especially liquid at room temperature.

The polyether having blocked hydroxyl groups preferably has a viscosity at 20° C. in the range from 30 to 5000 mPa·s, more preferably 40 to 2000 mPa·s, especially preferably 50 to 1000 mPas, in particular 50 to 500 mPas. The viscosity is determined here with a cone-plate viscometer having cone diameter 25 mm, cone angle 1°, cone tip-plate distance 0.05 mm, at a shear rate of 10 s$^{-1}$. Such a polyether is easy to handle and enables compositions having high elasticity.

The blocked hydroxyl groups are preferably selected from the group consisting of acetal, ester, aceto ester, carbonate and urethane groups.

These acetal, ester, aceto ester, carbonate or urethane groups preferably have 1 to 15 carbon atoms.

Particular preference is given to ester or urethane groups. Hydroxyl groups can be converted to these groups in a particularly simple manner.

Very particular preference is given to an ester group, especially an ester group having 1 to 8 carbon atoms.

Most preferred is an acetate group. A polyether having blocked hydroxyl groups in the form of acetate groups is of low viscosity, is obtainable in a very particularly simple manner and is particularly inexpensive. If it is hydrolyzed on the alkaline substrate, the odor-neutral hydroxy-functional polyether and acetate are released, the latter being nonvolatile in the alkaline medium and without significant odor.

Also preferred is a urethane group, especially a phenylurethane group or a p-toluenesulfonylurethane group. A polyether having such blocked hydroxyl groups has a manageable viscosity and is preparable in a particularly simple manner.

A preferred acetal group is a 1-(isobutoxy)ethoxy or a tetrahydropyran-2-oxy or a tetrahydrofuran-2-oxy group, especially a 1-(isobutoxy)ethoxy group.

A preferred aceto ester group is an acetoacetate group.

A preferred carbonate group is a methyl carbonate group.

These are of low viscosity and obtainable from inexpensive raw materials.

Repeat units present in the polyether having blocked hydroxyl groups are preferably 1,2-ethyleneoxy, 1,2-propyleneoxy, 1,3-propyleneoxy, 1,2-butyleneoxy or 1,4-butyleneoxy groups, especially 1,2-propyleneoxy groups.

Preferably, 70% to 100% by weight, especially 80% to 100% by weight, of the repeat units consist of 1,2-propyleneoxy groups, and 0% to 30% by weight, especially 0% to 20% by weight, of the repeat units consist of 1,2-ethyleneoxy groups.

More preferably, the repeat units consist entirely of 1,2-propyleneoxy groups. Such polyethers are readily available, hydrophobic and hence particularly suitable as a constituent of curable compositions having low water absorption and good stability.

The polyether having blocked hydroxyl groups preferably has an average molecular weight $M_n$ in the range from 600 to 10 000 g/mol, more preferably 700 to 5000 g/mol, especially 800 to 2500 g/mol, determined by means of gel permeation chromatography (GPC) against polystyrene as standard with tetrahydrofuran as mobile phase, refractive index detector and evaluation from 200 g/mol.

Such polyethers having blocked hydroxyl groups have a viscosity which is easy to handle and cause no migration effects, emissions or odor in curable compositions.

The polyether having blocked hydroxyl groups is preferably derived from at least one hydroxy-functional polyether selected from the group consisting of alcohol-started, especially n-butanol-started, polyoxypropylene monools having an OH number in the range from 25 to 90 mg KOH/g, preferably 50 to 80 mg KOH/g, polyoxypropylene diols having an OH number in the range from 12 to 155 mg KOH/g, preferably 22 to 125 mg KOH/g, especially 45 to 125 mg KOH/g, trimethylolpropane- or especially glycerol-started, optionally ethylene oxide-terminated polyoxypropylene triols having an average OH functionality in the range from 2.2 to 3 and an OH number in the range from 22 to 230 mg KOH/g, preferably 56 to 165 mg KOH/g, and sugar alcohol-started polyoxypropylene polyols having an average OH functionality in the range from 3 to 6, especially with threitol, erythritol, xylitol, mannitol or sorbitol as starter molecule. Such a polyether having blocked hydroxyl groups is commercially available as Sanflex® SPX-80 (from Sanyo Chem. Ind.).

Among these, preference is given to alcohol-started, especially n-butanol-started, polyoxypropylene monools or polyoxypropylene diols.

Particular preference is given to polyoxypropylene diols. These are particularly inexpensive.

The preferred polyethers having blocked hydroxyl groups are preparable from readily available commodities in a simple method, are of low viscosity and enable curable compositions having good storage stability, ease of handling, and high selectivity and elasticity in the cured state without any tendency to migration effects, emission or odor.

The polyether having blocked hydroxyl groups is especially obtained by reacting at least one hydroxy-functional polyether with at least one suitable blocking agent for hydroxyl groups.

For the reaction, the blocking agent is used at least stoichiometrically in relation to the hydroxyl groups, such that the hydroxyl groups are essentially completely blocked and the polyether obtained is thus essentially free of hydroxyl groups. For the blocking, methods customary for the respective reactive groups are used, optionally with additional use of catalysts or solvents. If the blocking reaction forms elimination products, these are removed from the reaction mixture by a suitable method, especially by means of distillation.

Suitable blocking agents are nucleophilic compounds that enter into an addition or substitution reaction with hydroxyl groups.

Especially suitable are vinyl ethers, carboxylic acids, carbonyl chlorides, carboxylic esters or carboxylic anhydrides, diketene, 2,2,5-trimethyl-4H-1,3-dioxin-4-one, alkyl acetoacetates, dialkyl carbonates, monoisocyanates, (meth) acrylamides, methylenemalonates or cyanoacrylates.

Preference is given to vinyl ethers such as, in particular, methyl vinyl ether, ethyl vinyl ether, isopropyl vinyl ether, butyl vinyl ether, isobutyl vinyl ether, isopropenyl methyl ether, isopropenyl ethyl ether, 2,3-dihydrofuran or 3,4-dihydro-2H-pyran, more preferably isobutyl vinyl ether, 2,3-dihydrofuran or 3,4-dihydro-2H-pyran, with formation of blocked hydroxyl groups in the form of acetal groups. The reaction is preferably conducted in the presence of acid as catalyst, especially hydrochloric acid, sulfuric acid, phosphoric acid or a sulfonic acid, optionally in the form of an acidic ion exchange resin.

Preference is given to carboxylic acids, carbonyl chlorides, carboxylic esters or carboxylic anhydrides, with formation of blocked hydroxyl groups in the form of ester groups. Among these, preference is given to carboxylic anhydrides or carboxylic esters, especially acetic anhydride.

In the case of acetic anhydride as blocking agent, the reaction releases acetic acid, with formation of blocked hydroxyl groups in the form of acetate groups.

In the case of isopropenyl acetate as blocking agent, the reaction releases acetone, likewise with formation of blocked hydroxyl groups in the form of acetate groups.

Preference is further given to diketene, 2,2,5-trimethyl-4H-1,3-dioxin-4-one or sterically hindered alkyl acetoacetates such as, in particular, tert-butyl acetoacetate, with formation of blocked hydroxyl groups in the form of aceto ester groups.

Preference is further given to dialkyl carbonates, especially dimethyl carbonate, with formation of blocked hydroxyl groups in the form of carbonate groups, especially methyl carbonate groups.

Preference is further given to monoisocyanates, with formation of blocked hydroxyl groups in the form of urethane groups. Preference is given to phenyl isocyanate or p-toluenesulfonyl isocyanate.

Suitable hydroxy-functional polyethers are especially those having an average OH functionality in the range from 1 to 6 and an average molecular weight in the range from 500 to 10 000 g/mol, more preferably 600 to 5000 g/mol, especially 700 to 2500 g/mol.

Preference is given to polyoxypropylene monools having an OH number in the range from 25 to 90 mg KOH/g, preferably 50 to 80 mg KOH/g, especially alcohol-started polyoxypropylene monools, especially started from methanol, ethanol, propanol, isopropanol, n-butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol. Among these, preference is given to alkyl alcohol-started polyoxypropylene monools, especially started from methanol, ethanol or n-butanol. Particular preference is given to n-butanol-started polyoxypropylene monools having an average molecular weight in the range from 650 to 2000 g/mol, especially 700 to 1500 g/mol. n-Butanol-started polyoxypropylene monools are commercially available, for example as Synalox® 100-20B, Synalox® 100-40B or Synalox® 100-85B (all from DowDuPont Inc.). Preference is further given to polyoxypropylene diols having an OH number in the range from 12 to 155 mg KOH/g, preferably 22 to 125 mg KOH/g, especially 45 to 125 mg KOH/g.

Preference is further given to trimethylolpropane- or especially glycerol-started, optionally ethylene oxide-terminated polyoxypropylene triols having an average OH functionality in the range from 2.2 to 3 and an OH number in the range from 22 to 230 mg KOH/g, preferably 56 to 165 mg KOH/g.

Preference is further given to sugar alcohol-started polyoxypropylene polyols having an average OH functionality of at least 3, especially in the range from 3 to 6, especially with threitol, erythritol, xylitol, mannitol or sorbitol as starter molecule.

The curable composition preferably comprises at least one curable polymer having fractions of polyether structural units, especially mainly polyoxypropylene structural units. The polyether having blocked hydroxyl groups is particularly compatible in such a curable composition, and shows barely any tendency to separate or migrate.

The curable composition preferably comprises at least one polymer containing isocyanate and/or silane groups.

The polymer containing isocyanate and/or silane groups preferably has an average molecular weight in the range from 1000 to 30 000 g/mol, especially 2000 to 20 000 g/mol.

It is preferably liquid at room temperature.

In a preferred embodiment, the composition contains at least one polymer containing isocyanate groups. Such a composition is also referred to as "polyurethane composition".

A suitable polymer containing isocyanate groups is especially obtained from the reaction of at least one polyol with a superstoichiometric amount of at least one diisocyanate. The reaction is preferably conducted with exclusion of moisture at a temperature in the range from 20 to 160° C., especially 40 to 140° C., optionally in the presence of suitable catalysts.

The NCO/OH ratio is preferably in the range from 1.3/1 to 10/1. The monomeric diisocyanate remaining in the reaction mixture after the reaction of the OH groups can be removed, especially by means of distillation.

If excess monomeric diisocyanate is removed by means of distillation, the NCO/OH ratio in the reaction is preferably in the range from 4/1 to 7/1, and the resultant polymer containing isocyanate groups, after the distillation, preferably contains not more than 0.5% by weight, more preferably not more than 0.3% by weight, of monomeric diisocyanate. Monomeric diisocyanate is especially removed by means of short-path distillation under reduced pressure.

If no excess monomeric diisocyanate is removed from the polymer, the NCO/OH ratio in the reaction is preferably in the range from 1.3/1 to 2.5/1.

The resultant polymer preferably has a content of isocyanate groups in the range from 0.5% to 10% by weight, especially 1% to 5% by weight, more preferably 1% to 3% by weight, and an average molecular weight in the range from 1500 to 20 000 g/mol, especially 2000 to 15 000 g/mol.

The polymer is optionally prepared with additional use of plasticizers or solvents, in which case the plasticizers or solvents used do not contain any groups reactive toward isocyanates.

Preference is given to aliphatic, cycloaliphatic or aromatic diisocyanates, especially hexamethylene 1,6-diisocyanate (HDI), 1-isocyanato-3,3,5-trimethyl-5-isocyanatomethylcyclohexane (isophorone diisocyanate or IPDI), perhydro(diphenylmethane 2,4′- and/or 4,4′-diisocyanate)

($H_{12}$MDI), diphenylmethane 4,4'-diisocyanate, with or without fractions of diphenylmethane 2,4'- and/or 2,2'-diisocyanate (MDI), or tolylene 2,4-diisocyanate or mixtures thereof with tolylene 2,6-diisocyanate (TDI).

Particular preference is given to HDI, IPDI, MDI or TDI, or mixtures thereof.

Suitable polyols are commercial polyols or mixtures thereof, especially polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene/acrylonitrile (SAN) particles or polyurea or polyhydrazodicarbonamide (PHD) particles.

Preferred polyether polyols are polyoxypropylene diols or polyoxypropylene triols, or what are called ethylene oxide-terminated (EO-capped or EO-tipped) polyoxypropylene diols or triols. The latter are mixed polyoxyethylene/polyoxypropylene polyols which are especially obtained in that polyoxypropylene diols or triols, on conclusion of the polypropoxylation reaction, are further alkoxylated with ethylene oxide and hence have primary hydroxyl groups.

Preferred polyether polyols have a level of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid, cyclohexane-1,2-dicarboxylic acid, cyclohexane-1,3-dicarboxylic acid or cyclohexane-1,4-dicarboxylic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two OH groups and having at least two different blocks having polyether, polyester and/or polycarbonate structure of the type described above, especially polyether polyester polyols.

Polyacrylate or polymethacrylate polyols.

Polyhydroxy-functional fats or oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes, such as alcoholysis or ozonolysis, and subsequent chemical linkage, for example by transesterification or dimerization, of the degradation products or derivatives thereof thus obtained. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Polyhydrocarbon polyols, also called oligohydrocarbonols, such as, in particular, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene or isoprene, especially polyhydroxy-functional acrylonitrile/butadiene copolymers, as can be prepared, in particular, from epoxides or amino alcohols and carboxyl-terminated acrylonitrile/butadiene copolymers (commercially available, for example, under the Hypro® CTBN or CTBNX or ETBN name from Emerald Performance Materials); or hydrogenated polyhydroxy-functional polymers or copolymers of dienes.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Especially preferred are polyether polyols, especially polyoxyalkylene polyols.

Most preferred are polyoxypropylene di- or triols or ethylene oxide-terminated polyoxypropylene di- or triols.

Preference is given to polyols having an average molecular weight in the range from 400 to 20 000 g/mol, preferably from 1000 to 15 000 g/mol.

Preference is given to polyols having an average OH functionality in the range from 1.6 to 3.

Preference is given to polyols that are liquid at room temperature.

In the preparation of a polymer containing isocyanate groups, it is also possible to additionally use fractions of di- or polyfunctional alcohols, especially ethane-1,2-diol, propane-1,2-diol, propane-1,3-diol, 2-methylpropane-1,3-diol, butane-1,2-diol, butane-1,3-diol, butane-1,4-diol, pentane-1,3-diol, pentane-1,5-diol, 3-methylpentane-1,5-diol, neopentyl glycol, dibromoneopentyl glycol, hexane-1,2-diol, hexane-1,6-diol, heptane-1,7-diol, octane-1,2-diol, octane-1,8-diol, 2-ethylhexane-1,3-diol, diethylene glycol, triethylene glycol, dipropylene glycol, tripropylene glycol, cyclohexane-1,3- or -1,4-dimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols, such as especially xylitol, sorbitol or mannitol, or sugars such as, in particular, sucrose, or alkoxylated derivatives of the alcohols mentioned or mixtures of the alcohols mentioned.

The polymer containing isocyanate groups preferably has an average molecular weight in the range from 1500 to 20 000 g/mol, especially 2000 to 15 000 g/mol.

In addition to a polymer containing isocyanate groups, the composition may comprise at least one oligomeric isocyanate or a form of MDI that is liquid at room temperature.

Suitable oligomeric isocyanates are especially HDI biurets such as Desmodur® N 100 or N 3200 (from Covestro AG), Tolonate® HDB or HDB-LV (from Vencorex Holding SAS) or Duranate® 24A-100 (from Asahi Kasei Corp.); HDI isocyanurates such as Desmodur® N 3300, N 3600 or N 3790 BA (all from Covestro AG), Tolonate® HDT, HDT-LV or HDT-LV2 (from Vencorex Holding SAS), Duranate® TPA-100 or THA-100 (from Asahi Kasei Corp.) or Coronate® HX (from Tosoh Corp.); HDI uretdiones such as Desmodur® N 3400 (from Covestro AG); HDI iminooxadiazinediones such as Desmodur® XP 2410 (from Covestro AG); HDI allophanates such as Desmodur® VP LS 2102 (from Covestro AG); IPDI isocyanurates, for example in solution as Desmodur® Z 4470 (from Covestro AG) or in solid form as Vestanat® T1890/100 (from Evonik Industries AG); TDI oligomers such as Desmodur® IL (from Covestro AG); or mixed isocyanurates based on TDI/HDI, such as Desmodur® HL (from Covestro AG).

A form of MDI which is liquid at room temperature is either 4,4'-MDI liquefied by partial chemical modification—especially carbodiimidization or uretonimine formation or adduct formation with polyols—or it is a mixture of 4,4'-MDI with other MDI isomers (2,4'-MDI and/or 2,2'-MDI), and/or with MDI oligomers and/or MDI homologs (polymeric MDI or PMDI), that has been brought about selectively by blending or results from the production process.

In a preferred embodiment of the invention, the curable composition comprises, in addition to at least one polymer containing isocyanate groups, at least one latent curing agent. Such polyurethane compositions are particularly less prone to blistering during curing.

Preferred latent curing agents are ketimines, aldimines or oxazolidines, especially oxazolidines or aldimines, most preferably aldimines.

Preference is given to an aldimine of the formula A—[N═B]$_y$ where y is 2 or 3, A is an organic radical having 2 to 23 carbon atoms, and B is an organic radical having 6 to 30 carbon atoms.

A is preferably an alkylene radical optionally having cyclic components or a di- or trivalent polyoxyalkylene radical having 5 to 15 carbon atoms, especially 1,6-hexylene, (1,5,5-trimethylcyclohexan-1-yl)methane-1,3 or α,ω-polyoxypropylene having an average molecular weight in the range from 170 to 300 g/mol or trimethylolpropane-started tris(ω-polyoxypropylene) having an average molecular weight in the range from 330 to 500 g/mol.

B is preferably an organic radical having 7 to 22 carbon atoms, especially 2,2-dimethyl-3-acetoxypropylidene, 2,2-dimethyl-3-lauroyloxypropylidene, 2,2-dimethyl-3-(N-morpholino)propylidene, benzylidene or alkyl-substituted benzylidene, especially 4-decylbenzylidene, 4-undecylbenzylidene, 4-dodecylbenzylidene, 4-tridecylbenzylidene or 4-tetradecylbenzylidene, in which the 4-alkyl radicals are mainly branched.

More preferably, B is a radical having at least 15 carbon atoms, especially 2,2-dimethyl-3-lauroyloxypropylidene or alkyl-substituted benzylidene. Such an aldimine is odorless.

An aldimine of the formula A—[N═B]$_y$ is especially obtained by reaction of an amine of the formula A-(NH$_2$)$_y$ with an aldehyde of the formula O═B, with removal of water of condensation.

Preferred amines A-(NH$_2$)$_y$ are aliphatic or cycloaliphatic primary di- or triamines, especially hexamethylene-1,6-diamine, isophoronediamine, α,ω-polyoxypropylenediamines having an average molecular weight in the range from 200 to 350 g/mol, especially Jeffamine® D-230 (from Huntsman Corp.), or trimethylolpropane-started tris(ω-polyoxypropyleneamine), especially Jeffamine® T-403 (from Huntsman Corp.).

Preferred aldehydes O═B are aldol esters of carboxylic acids, especially 2,2-dimethyl-3-acetoxypropanal, 2,2-dimethyl-3-lauroxyloxypropanal, 2,2-dimethyl-3-(N-morpholino)propanal, benzaldehyde, or benzaldehydes substituted by alkyl radicals, especially 4-decylbenzaldehyde, 4-undecylbenzaldehyde, 4-dodecylbenzaldehyde, 4-tridecylbenzaldehyde or 4-tetradecylbenzaldehyde, in which the 4-alkyl radicals are mainly branched, and mixtures of these benzaldehydes substituted by alkyl radicals.

On contact with moisture, the latent curing agent releases amino groups and possibly hydroxyl groups, which react with isocyanates and act as crosslinkers. This releases an aldehyde or ketone.

In the case of the preferred aldehydes of the formula O═B in which B is a long-chain radical, especially a radical having 15 or more carbon atoms, this does not cause any odor problems and remains in the composition after curing, where it has good compatibility and acts as a further plasticizer.

Compared to the direct reaction of water with isocyanates, crosslinking via latent curing agents has the advantage that no $CO_2$ is released, which greatly reduces the tendency to form blisters in the course of curing.

In a further preferred embodiment, the curable composition contains at least one organic polymer containing silane groups. Such a polymer is also referred to as a "silane-modified polymer" (SMP), and such a composition is thus also referred to as an SMP composition.

The organic polymer containing silane groups preferably has silane groups of the formula

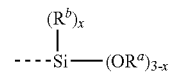

where
  $R^a$ is a linear or branched, monovalent hydrocarbyl radical having 1 to 5 carbon atoms, especially methyl or ethyl,
  $R^b$ is a linear or branched monovalent hydrocarbyl radical having 1 to 8 carbon atoms, especially methyl, and x has a value of 0 or 1 or 2, preferably 0 or 1, especially 0.

Methoxysilane groups have the advantage here that they are particularly reactive.

Ethoxysilane groups have the advantage that they are toxicologically advantageous and particularly storage-stable.

Particular preference is given to trimethoxysilane groups, dimethoxymethylsilane groups or triethoxysilane groups.

Most preferred are trimethoxysilane groups or triethoxysilane groups.

A preferred organic polymer containing silane groups is a polyolefin or a polyester or a polyamide or a poly(meth)acrylate or a polyether or a mixed form of these polymers. The silane groups may be in pendant positions in the chain or in terminal positions and are attached to the organic polymer via a carbon atom.

More preferably, the organic polymer containing silane groups is a polyether containing silane groups.

"Polyethers containing silane groups" refer to organic polymers containing at least one silane group, wherein the polymer chain has mainly polyether units, especially 1,2-oxypropylene units. As well as the polyether units, it is especially also possible for there to be urethane groups, urea groups, thiourethane groups, ester groups or amide groups.

The polyether containing silane groups preferably contains at least 50% by weight, especially at least 70% by weight, more preferably at least 80% by weight, of 1,2-oxypropylene units.

Processes for preparing suitable polyethers containing silane groups are known to the person skilled in the art.

In a preferred process, polyethers containing silane groups are obtainable from the reaction of polyethers containing allyl groups with hydrosilanes, optionally with chain extension using diisocyanates for example.

In a further preferred process, polyethers containing silane groups are obtainable from the copolymerization of alkylene oxides and epoxysilanes, optionally with chain extension using diisocyanates for example.

In a further preferred process, polyethers containing silane groups are obtainable from the reaction of polyether polyols with isocyanatosilanes, optionally with chain extension using diisocyanates.

In a further preferred process, polyethers containing silane groups are obtainable from the reaction of polyethers containing isocyanate groups with aminosilanes, hydroxysilanes or mercaptosilanes. Polyethers containing silane groups from this process are particularly preferred. This process enables the use of a multitude of commercially readily available inexpensive starting materials by means of which different polymer properties are obtainable, especially high extensibility, high strength, low modulus of elasticity, low glass transition temperature or high weathering resistance.

More preferably, the polyether containing silane groups is obtainable from the reaction of polyethers containing isocyanate groups with aminosilanes and/or hydroxysilanes and/or mercaptosilanes.

Suitable polyethers containing isocyanate groups are especially obtainable from the reaction of polyether polyols, especially polyoxyalkylene diols or polyoxyalkylene triols, preferably polyoxypropylene diols or polyoxypropylene triols, with a superstoichiometric amount of diisocyanates.

It is preferable when the reaction between the diisocyanate and the polyether polyol is conducted with exclusion of moisture at a temperature of 50° C. to 160° C., optionally in the presence of suitable catalysts, wherein the diisocyanate has been dosed such that the isocyanate groups thereof are present in a stoichiometric excess in relation to the hydroxyl groups of the polyol. In particular, the excess of diisocyanate is chosen so as to leave, after the reaction of all hydroxyl groups, a content of free isocyanate groups of 0.1% to 5% by weight, preferably 0.2% to 4% by weight, more preferably 0.3% to 3% by weight, based on the overall polymer. Preferred diisocyanates are those already mentioned above. Particular preference is given to IPDI or TDI. Most preferred is IPDI. In this way, polyethers containing silane groups with particularly good lightfastness are obtained.

Especially suitable as polyether polyols are polyoxypropylenediols having a degree of unsaturation lower than 0.02 meq/g, especially lower than 0.01 meq/g, and an average molecular weight in the range from 400 to 25 000 g/mol, especially 1000 to 20 000 g/mol.

In addition to polyether polyols, it is also possible to use proportions of other polyols, especially polyacrylate polyols, and also low molecular weight diols or triols.

Suitable aminosilanes for the reaction with a polyether containing isocyanate groups are primary and especially secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the recited aminosilanes with ethoxy groups in place of the methoxy groups on the silicon.

Suitable hydroxysilanes for the reaction with a polyether containing isocyanate groups are especially obtainable from the addition of aminosilanes onto lactones or onto cyclic carbonates or onto lactides.

Preferred hydroxysilanes that are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropyl carbamate.

Further suitable hydroxysilanes are obtainable from the addition of aminosilanes onto epoxides or from the addition of amines onto epoxysilanes.

Preferred hydroxysilanes that are obtained in this way are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Suitable mercaptosilanes for the reaction with a polyether containing isocyanate groups are especially 3-mercaptopropyltrimethoxysilane or 3-mercaptopropyltriethoxysilane.

Further suitable polyethers containing silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials Inc.; especially the 1010LM, 1015LM, 1050MM products); Vorasil™ (from DowDuPont Inc.; especially the 602 and 604 products); Desmoseal® (from Covestro AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products).

More preferably, the polyether containing silane groups is obtained from the reaction of at least one polyether containing isocyanate groups with at least one aminosilane and/or hydroxysilane and/or mercaptosilane.

Preferably, the aminosilane and/or hydroxysilane and/or mercaptosilane here is selected from the group consisting of dimethyl N-(3-trimethoxysilylpropyl)aminosuccinate, diethyl N-(3-trimethoxysilylpropyl)aminosuccinate, dimethyl N-(3-triethoxysilylpropyl)aminosuccinate, diethyl N-(3-triethoxysilylpropyl)aminosuccinate, N-(3-trimethoxysilylpropyl)-2-hydroxypropanamide, N-(3-triethoxysilylpropyl)-2-hydroxypropanamide, 3-mercaptopropyltrimethoxysilane and 3-mercaptopropyltriethoxysilane.

The preferred embodiments of the organic polymer containing silane groups enable compositions having good storage stability, rapid curing and particularly good mechanical properties, especially high elasticity and extensibility coupled with good strength, and high thermal stability.

The curable composition preferably additionally comprises one or more further constituents, especially selected from the group consisting of fillers, adhesion promoters, desiccants, thickeners and catalysts.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

In a preferred embodiment, the composition comprises at least one filler based on calcium carbonate. This is advantageous especially in the case of polyethers having blocked hydroxyl groups in the form of ester groups, such as acetate groups in particular, since any acids released therefrom by hydrolysis, such as acetic acid in particular, are bound by the calcium carbonate and hence do not cause any odor emissions.

The composition preferably contains 5% to 50% by weight, especially 10% to 40% by weight, of fillers based on calcium carbonate.

Suitable adhesion promoters are especially aminosilanes such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N [3-(trimethoxysilyl)propyl]ethylenediamine or the analogs thereof with ethoxy in place of methoxy groups, and also N-phenyl-, N-cyclohexyl- or N-alkylaminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, especially amino-functional methylsilsesquioxane or amino-functional propylsilsesquioxane, or titanates.

Especially suitable as adhesion promoters for a composition containing isocyanate groups are epoxysilanes such as, in particular, 3-glycidoxypropyltrimethoxysilane or 3-glycidoxypropyltriethoxysilane, (meth)acryloylsilanes, anhydridosilanes, carbamatosilanes, alkylsilanes or iminosilanes, or oligomeric forms of these silanes.

Suitable desiccants for compositions comprising polymers containing silane groups are especially tetraethoxysilane, vinyltrimethoxysilane, vinyltriethoxysilane or organoalkoxysilanes having a functional group in a position to the silane group, especially N-(methyldimethoxysilylmethyl)-O-methylcarbamate, (methacryloyloxymethyl)silanes, methoxymethylsilanes, orthoformic esters, calcium oxide or molecular sieve powders.

Suitable desiccants for compositions containing isocyanate groups are especially molecular sieve powders, calcium oxide, highly reactive isocyanates such as p-tosyl isocyanate, monomeric diisocyanates or orthoformic esters.

Suitable thickeners are especially ureas, sheet silicates such as bentonites, derivatives of castor oil, hydrogenated castor oil, polyamides, polyurethanes or fumed silicas.

A preferred thickener is a paste spreadable at room temperature and containing 10% to 25% by weight of urea compounds and 75% to 90% by weight of the above-described polyethers having blocked hydroxyl groups. Such a paste is especially produced by reacting a diisocyanate, especially diphenylmethane 4,4′-diisocyanate, and a monoamine, especially n-butylamine, in the polyether having blocked hydroxyl groups.

Suitable catalysts are catalysts for the crosslinking of silane groups, especially metal catalysts such as, in particular, compounds of tin, titanium, zirconium, aluminum or zinc, and/or nitrogen compounds. Preference is given to diorganotin(IV) compounds such as, in particular, dibutyltin(IV) diacetate, dibutyltin(IV) dilaurate, dibutyltin(IV) dineodecanoate, dibutyltin(IV) bis(acetylacetonate) or dioctyltin(IV) dilaurate, and also titanium(IV) or zirconium(IV) or aluminum(III) or zinc(II) complexes with, in particular, alkoxy, carboxylate, 1,3-diketonate, 1,3-ketoesterate or 1,3-ketoamidate ligands, especially organotitanates, and also amines, amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene, 6-dibutylamino-1,8-diazabicyclo[5.4.0]undec-7-ene, N,N′-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole, N-(3-triethoxysilylpropyl)-4,5-dihydroimidazole, 1-(3-dimethylaminopropyl)-2-methyl-1,4,5,6-tetrahydropyrimidine, 1-(3-aminopropyl)-2-methyl-1,4,5,6-tetrahydropyrimidine or reaction products thereof, or guanidines such as, in particular, 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)propyl)-1,1,3,3-tetramethylguanidine, 2-(3-(triethoxysilyl)propyl)-1,1,3,3-tetramethylguanidine, 1,5,7-triazabicyclo[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine, 2-guanidinobenzimidazole or guanidines from the reaction of monoamines, polyamines or aminosilanes with carbodiimides, especially dicyclohexylcarbodiimide or diisopropylcarbodiimide, and biguanides or imidazoles.

Preference is given to organotitanates, especially bis(ethylacetoacetato)diisobutoxytitanium(IV) (commercially available, for example, as Tyzor® IBAY from Dorf Ketal), bis(ethylacetoacetato)diisopropoxytitanium(IV) (commercially available, for example, as Tyzor® DC from Dorf Ketal), bis(acetylacetonato)diisopropoxytitanium(IV), bis(acetylacetonato)diisobutoxytitanium(IV), tris(oxyethyl)amineisopropoxytitanium(IV), bis[tris(oxyethyl)amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxy)diethoxytitanium(IV), tetra(isopropoxy)titanate, tetra(n-butoxy)titanate, tetra(2-ethylhexyloxy)titanate or polybutyl titanate, especially bis(ethylacetoacetato)diisobutoxytitanium(IV) or bis(ethylacetoacetato)diisopropoxytitanium(IV).

Preference is further given to amidines or guanidines, especially DBU, 1-(3-dimethylaminopropyl)-2-methyl-1,4,5,6-tetrahydropyrimidine, 1-(3-aminopropyl)-2-methyl-1,4,5,6-tetrahydropyrimidine or reaction products thereof, or guanidines from the reaction of monoamines, polyamines or aminosilanes with dicyclohexylcarbodiim ide or diisopropylcarbodiim ide.

Preference is further given to combinations of these catalysts, especially combinations of at least one organotitanate and at least one amidine or guanidine.

Suitable catalysts are also catalysts for the acceleration of the reaction of isocyanate groups, especially organotin(IV) compounds, such as especially dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2′-dimorpholinodiethyl ether (DMDEE).

Suitable catalysts are also catalysts for the hydrolysis of latent curing agents, especially carboxylic acids, such as 2-ethylhexanoic acid, lauric acid, stearic acid, neodecanoic acid, benzoic acid, salicylic acid or 2-nitrobenzoic acid, organic carboxylic anhydrides, silyl esters of carboxylic acids, organic sulfonic acids, sulfonic esters, other organic or inorganic acids, or mixtures of the abovementioned acids or esters. Preference is given to aromatic carboxylic acids such as benzoic acid, 2-nitrobenzoic acid or especially salicylic acid.

The curable composition may contain further additions, especially:
- inorganic or organic pigments, especially titanium dioxide, chromium oxides or iron oxides;
- additional plasticizers;
- fibers, especially glass fibers, carbon fibers, metal fibers, ceramic fibers, polymer fibers, such as polyamide fibers or polyethylene fibers, or natural fibers, such as wool, cellulose, hemp or sisal;
- nanofillers such as graphene or carbon nanotubes;
- dyes;
- further catalysts which accelerate the reaction of the isocyanate groups and/or silane groups, especially salts, soaps or complexes of tin(II), iron, aluminum, molybdenum, dioxomolybdenum or potassium, especially aluminum lactate, aluminum oleate or potassium acetate; compounds containing tertiary amino groups, especially N-ethyldiisopropylamine, N,N,N′,N′-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), N-alkylmorpholines, N,N′-dimethylpiperazine; aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; and what are called "delayed action" catalysts, which are modifications of known metal or amine catalysts;
- solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvesso™ grades (from ExxonMobil Chemical Co.), and propylene carbonate, dimethyl carbonate, butyrolactone, N-methylpyrrolidone, N-ethylpyrrolidone, p-chlorobenzotrifluoride or benzotrifluoride;
- natural resins, fats or oils, such as rosin, shellac, linseed oil, castor oil or soybean oil;
- nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);
- flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;
- additives, especially wetting agents, leveling agents, defoamers, deaerators, stabilizers against oxidation, heat, light or UV radiation, or biocides;

or further substances customarily used in curable compositions.

It may be advisable to chemically or physically dry certain substances before mixing them into the composition.

The curable composition is preferably largely free of fatty alcohol ester-containing plasticizers. It is especially largely free of phthalates. It preferably contains less than 2% by weight, more preferably less than 1% by weight, especially less than 0.5% by weight, of phthalates.

The curable composition preferably contains 10% to 40% by weight of polyethers having blocked hydroxyl groups.

A preferred curable composition comprises
10% to 50% by weight of polymer containing isocyanate and/or silane groups,
20% to 60% by weight of fillers and
10% to 40% by weight of polyether having blocked hydroxyl groups.

The curable composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The curable composition may be in the form of a one-component composition or in the form of a multi-component, especially two-component, composition.

A composition referred to as a "one-component" composition is one in which all constituents of the composition are in the same container, which is storage-stable per se and which is curable with moisture.

A composition referred to as a "two-component" composition is one in which the constituents of the composition are in two different components which are stored in separate containers and are not mixed with one another until shortly before or during the application of the composition.

The curable composition is preferably a one-component moisture-curing composition. Given suitable packaging and storage, it is storage-stable, typically over several months, up to one year or longer.

The curable composition, in the use of the invention, is applied to at least one alkaline substrate. The substrate may have been pretreated prior to the application, especially by cleaning methods or the applying of an activator or primer, in which case any activator or primer applied typically does not completely seal the surface of the substrate, such that it still gives an alkaline reaction, at least in some parts.

On application of the composition, the process of curing commences. This results in the cured composition.

In the case of a one-component moisture-curing composition, it is applied as such and then begins to cure under the influence of moisture or water. For acceleration of the curing, an accelerator component which contains or releases water and/or a catalyst can be mixed into the composition on application, or the composition, after application thereof, can be contacted with such an accelerator component. In the case of a two-component composition, it is applied after the mixing of the two components and begins to cure by internal reaction, and the curing may be completed by the action of external moisture. The two components can be mixed continuously or batchwise with dynamic mixers or static mixers.

In the course of curing, isocyanate groups present react under the influence of moisture with one another and/or with any further reactive groups present in the composition, especially hydroxyl groups or amino groups. In addition, isocyanate groups present react with hydrolyzing reactive groups of any latent curing agents present. Silane groups present react with one another under the influence of moisture in the course of curing. They can be hydrolyzed on contact with moisture to give silanol groups (Si—OH groups). Silane groups present can condense with silanol groups present to give siloxane groups (Si—O—Si groups).

The moisture required for curing of a moisture-curing composition preferably gets into the composition through diffusion from the air (air humidity). In the process, a solid layer of cured composition (skin) is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The curable composition is preferably applied at ambient temperature, especially in the range from about −10 to 50° C., preferably in the range from −5 to 45° C., especially 0 to 40° C.

The composition is preferably likewise cured at ambient temperature.

The curable composition may be formulated in such a way that it has a pasty consistency with a high yield point, especially for use as an adhesive or sealant. Such a composition can be applied by spatula or under pressure by means of a suitable device, for example by means of a cartridge gun or a drum pump or an application robot, wherein the composition is especially discharged in the form of a bead having an essentially round or triangular cross-sectional area. The layer thickness of the composition applied is especially in the range from 0.5 to 50 mm, preferably 1 to 30 mm.

The curable composition can also be formulated such that it is fluid and "self-leveling" or only slightly thixotropic, especially for use as sealing compound or coating. Such a composition can be applied by pouring it out or by spatula. In the form of a coating, it can then be distributed over an area to give the desired layer thickness, for example by means of a roll, doctor blade, notched trowel or rubber squeegee. In one operation, typically a layer thickness in the range from 0.5 to 5 mm, especially 1 to 3 mm, is applied.

The curable composition is storage-stable, easy to handle and highly elastic after curing, and does not show any tendency to separate or migrate. It enables elastic bonding, sealing or coating of alkaline substrates, such as, in particular, fresh or green concrete or cement mortar, without occurrence of troublesome odors triggered by plasticizer hydrolysis.

The invention further provides a method of bonding or sealing or coating, comprising the steps of
  (i) providing the curable composition as described above,
  (ii) providing at least one alkaline substrate as described above,
  (iii) contacting the curable composition with the alkaline substrate,
  (iv) curing the composition.

In the case of a two- or multicomponent composition, the components are mixed prior to step (iii).

Step (iii) can be effected by applying the curable composition to the alkaline substrate.

In addition, step (iii) can be effected by applying the curable composition to any substrate and then contacting the composition applied with the alkaline substrate.

The composition may be applied between two or more substrates, or it may be contacted with further substrates after application to a first substrate. In this case, at least one of the substrates with which the composition applied is in contact is an alkaline substrate as described above.

Further substrates that may be in contact with the composition are especially:
  glass, glass ceramic, concrete, mortar, cement screed, fiber cement, especially fiber cement boards, brick, tile, gypsum, especially gypsum boards or anhydride screed, or natural stone, such as granite or marble;
  repair or leveling compounds based on PCC (polymer-modified cement mortar) or ECC (epoxy resin-modified cement mortar);

metals or alloys, such as aluminum, copper, iron, steel, nonferrous metals, including surface-finished metals or alloys, such as zinc-plated or chromium-plated metals; asphalt or bitumen;

leather, textiles, paper, wood, wood materials bonded with resins, such as phenolic, melamine or epoxy resins, resin/textile composites or further materials known as polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets.

If required, the substrates can be pretreated prior to application, especially by physical and/or chemical cleaning methods or the application of an activator or a primer.

It is possible to bond and/or seal identical or different substrates.

Application between multiple substrates is typical especially in the case of a sealant for joins, whereas application to a first substrate and then contacting with a second substrate is typical of an adhesive. Such an adhesive may also have a sealing function.

A coating is typically applied only to one substrate, although there are also possible cases where a coating is in contact with further substrates, for example in edge regions.

The curable composition, depending on its use, is preferably an adhesive or sealant or coating.

The cured adhesive or sealant or coating is preferably elastic.

As adhesive, the composition is especially suitable for bonding and sealing applications in the construction industry on alkaline substrates, especially for parquet bonding on fresh cement screed or for the bonding of components on fresh concrete.

As sealant, the composition is especially suitable for the sealing of joints, seams or cavities of alkaline substrates in construction, especially for the sealing of dilation joins or connection joins between components.

As coating, the composition is especially suitable for the protection of alkaline substrates, especially floors or walls, especially as coating of balconies, terraces, open spaces, bridges, parking levels, or for the sealing of roofs, especially flat roofs or slightly inclined roof areas or roof gardens, or in the interior of buildings for water sealing, for example beneath tiles or ceramic plates in plumbing units or kitchens, or as floor covering in kitchens, industrial buildings or manufacturing spaces, or as a seal in collection tanks, channels, shafts, silos, tanks or wastewater treatment plants.

The method of bonding or sealing or coating affords an article.

The invention thus further provides an article bonded, sealed or coated with the composition described.

The article is especially a built structure above or below ground or part thereof, especially a bridge, a roof, a stairway, a floor or a façade, or an installable component thereof.

More preferably, the article is a parquet floor bonded to a screed of concrete or cement mortar, which has been bonded to the still-fresh and hence alkaline screed. The use of an adhesive that does not release any intensely odorous cleavage products in the alkaline medium is particularly important here, since the adhesive is being applied indoors over a comparatively large area, which means that any odor emissions that occur are particularly intense, long-lasting and troublesome.

The method of bonding or sealing or coating affords an adhesive bond. The invention thus further provides an adhesive bond comprising the cured composition as described above and at least one substrate adhering to the composition, the surface of which was alkaline at the time of contacting with the composition, as described above.

The cured composition preferably comprises
10% to 50% by weight of cured polymer,
20% to 60% by weight of fillers, and
10% to 40% by weight of polyether having blocked hydroxyl groups.

The cured composition in the adhesive bond of the invention preferably has a layer thickness in the range from 0.5 to 50 mm, preferably 1 to 30 mm.

The adhesive bond is part of the article bonded, sealed or coated with the composition.

The use of the invention enables elastic bonding, sealing or coating of alkaline substrates, such as, in particular, fresh or green concrete or cement mortar, without occurrence of troublesome odors triggered by plasticizer hydrolysis, as typically occurs in the case of customary plasticizers such as DIDP or DINCH.

EXAMPLES

Working examples are adduced hereinafter, which are intended to elucidate the invention described. The invention is of course not limited to these described working examples.

"Standard climatic conditions" ("SCC") refer to a temperature of 23±1° C. and a relative air humidity of 50±5%.

Unless otherwise stated, the chemicals used were from Sigma-Aldrich Chemie GmbH.

Preparation of Polyethers Having Blocked Hydroxyl Groups:

Viscosity was measured with a thermostated Rheotec RC30 cone-plate viscometer (cone diameter 25 mm, cone angle 1°, cone tip-plate distance 0.05 mm, shear rate 10 s$^{-1}$).

Infrared spectra (FT-IR) were measured as undiluted films on a Nicolet iS5 FT-IR instrument from Thermo Scientific equipped with a horizontal ATR measurement unit with a diamond crystal. The absorption bands are reported in wavenumbers (cm$^{-1}$).

$^1$H NMR spectra were measured on a spectrometer of the Bruker Ascend 400 type at 400.14 MHz; the chemical shifts δ are reported in ppm relative to tetramethylsilane (TMS). No distinction was made between true coupling and pseudo-coupling patterns.

Polyether-1: n-Butanol-Started Acetylated PPG Monool with Average Molecular Weight about 800 g/mol 120.00 g of n-butanol-started polyoxypropylene monool (Synalox® 100-20B, average molecular weight about 750 g/mol; from DowDuPont Inc.) and 18.74 g of acetic anhydride were initially charged in a round-bottom flask with distillation attachment under a nitrogen atmosphere. Then the reaction mixture was stirred under a gentle nitrogen stream at 130° C., with collection of acetic acid as distillate. Subsequently, the volatile constituents were removed from the reaction mixture at 80° C. and a reduced pressure of 10 mbar. A clear, colorless liquid having a viscosity of 75 mPa·s at 20° C. was obtained.

FT-IR: 2970, 2931, 2867, 1738, 1454, 1372, 1345, 1296, 1241, 1098, 1014, 959, 925, 866, 827.

$^1$H NMR (CDCl$_3$): 5.02 (hept., 1H, CH$_2$(CH$_3$)CH—OAc), 3.75-3.34 (2×m, about 39H, OCH$_2$CH(CH$_3$)O), 3.33-3.28 (m, 2H, CH$_3$CH$_2$CH$_2$CH$_2$O), 2.04 (s, 3H, O(CO)CH$_3$), 1.55 (quint., 2H, CH$_3$CH$_2$CH$_2$CH$_2$O), 1.36 (sext., 2H, CH$_3$CH$_2$CH$_2$CH$_2$O), 1.22 (d, 3H, CH$_2$(CH$_3$)CH—OAc), 1.17-1.10 (m, about 36H, OCH$_2$CH(CH$_3$)O), 0.91 (t, 3H, CH$_3$CH$_2$CH$_2$CH$_2$O).

Polyether-2: Diacetylated PPG Diol with Average Molecular Weight about 1100 g/mol 80.00 g of polyoxypropylene diol (Voranol® P 1010, OH number 110 mg KOH/g; from DowDuPont Inc.) and 18.74 g of acetic anhydride were converted as described for Polyether-1. A clear, colorless liquid having a viscosity of 145 mPa·s at 20° C. was obtained.

Polyether-3: Diacetylated PPG Diol with Average Molecular Weight about 2100 g/mol 160.00 g of polyoxypropylene diol (Voranol® 2000 L, OH number 56 mg KOH/g; from DowDuPont Inc.) and 18.74 g of acetic anhydride were converted as described for Polyether-1. A clear, colorless liquid having a viscosity of 400 mPa·s at 20° C. was obtained.

Preparation of Further Starting Materials:

Polymer P1:

3080 g of polyoxypropylene diol (Acclaim® 4200, from Covestro AG; OH number 28.5 mg KOH/g), 1540 g of polyoxypropylenepolyoxyethylene triol (Caradol® MD34-02, from Shell Chemicals Co.; OH number 35.0 mg KOH/g) and 385 g of tolylene diisocyanate (Desmodur® T 80 P, Covestro AG) were reacted at 80° C. by a known method to give an NCO-terminated polyurethane polymer which is liquid at room temperature and has a content of free isocyanate groups of 1.50% by weight.

Aldimine-1: N,N-Bis(2,2-dimethyl-3-lauroyloxypropylidene)-3-aminomethyl-3,5,5-trimethylcyclohexylamine 598 g (2.1 mol) of 2,2-dimethyl-3-lauroyloxypropanal was initially charged in a round-bottom flask under a nitrogen atmosphere. Then 170.3 g (1 mol) of 3-aminomethyl-3,5,5-trimethylcyclohexylam ine (Vestamin® IPD, from Evonik Industries AG) was added with good stirring, and then the volatile constituents were removed at 80° C. and a reduced pressure of 10 mbar. 732 g of a colorless liquid having an amine content of 2.73 mmol N/g was obtained, corresponding to a calculated aldimine equivalent weight of 367 g/mol.

Thixotropic Agent T-1:

A vacuum mixer was initially charged with 300 g of polyether-1 and 48 g of methylene diphenyl 4,4-diisocyanate (Desmodur® 44 MC L, from Covestro AG) and heated up slightly, and then 27 g of n-butylamine was slowly added dropwise with vigorous stirring. The resultant paste was stirred for a further hour under reduced pressure while cooling. A white, finely divided, homogeneous, spreadable paste was obtained.

Thixotropic Agent T-2:

Prepared as described for thixotropic agent T-1, except that 300 g of polyether-2 was used in place of polyether-1. A white, finely divided, homogeneous, spreadable paste was obtained.

Thixotropic Agent T-3:

Prepared as described for thixotropic agent T-1, except that 300 g of diisodecyl phthalate (Palatinol® 10-P, from BASF SE) was used in place of Polyether-1. A white, finely divided, homogeneous, spreadable paste was obtained.

Thixotropic Agent T-4:

Prepared as described for thixotropic agent T-1, except that 300 g of diisononyl cyclohexane-1,2-dicarboxylate (Hexamoll® DINCH, from BASF SE) was used in place of Polyether-1. A white, finely divided, homogeneous, spreadable paste was obtained.

Production of Mortar Prisms:

A dry mix was produced with 1300 parts by weight (PW) of 0 to 1 mm quartz sand, 200 PW of ground limestone (unburnt) and 900 PW of CEM I 42.5N portland cement. Separately, 400 PW of water was mixed with 6.3 PW of Sika® ViscoCrete®-3082 (retardant/plasticizer; from Sika Schweiz AG), and this mixture was mixed well with the dry mix in a mechanical mixer for 3 min. The mortar obtained was poured into several 80×40×40 mm molds, covered with plastic film and stored under standard climatic conditions.

After 24 hours, the plastic film was removed and cured but still fresh mortar prisms were taken out of the molds, brushed on the outside with a steel brush and freed of dust. Curable compositions as described below were applied immediately to the fresh (green) mortar prisms thus prepared.

Production of Curable (One-Component) Compositions:

Compositions Z1 to Z5

For each composition, the ingredients specified in table 1 were mixed in the amounts specified (in parts by weight) by means of a centrifugal mixer (SpeedMixer™ DAC 150, FlackTek Inc.) with exclusion of moisture at 3000 rpm for one minute.

Each Composition was Tested as Follows:

As a measure of the open time, skin time (ST) was determined. For this purpose, a few grams of the composition were applied to cardboard in a layer thickness of about 2 mm and, under standard climatic conditions, the first period of time after which no residues remained any longer on an LDPE pipette used to gently tap the surface of the composition was determined.

Shore A hardness was determined to DIN 53505 on test specimens cured under standard climatic conditions for 14 days.

To determine the mechanical properties, the composition was applied to a PTFE-coated film to give a film of thickness 2 mm, the film was stored under standard climatic conditions for 14 days, and a few dumbbells having a length of 75 mm with a bar length of 30 mm and a bar width of 4 mm were punched out of the film and these were tested in accordance with DIN EN 53504 at a strain rate of 200 mm/minute for Tensile strength (breaking force), Elongation at break, Modulus of elasticity 5% (at 0.5%-5% elongation) and Modulus of elasticity 25% (at 0.5%-25% elongation).

Appearance was assessed visually on the films produced. "Nice" was used to describe a nontacky film without blisters.

Odor was assessed by smelling by nose at a distance of 2 cm from the freshly produced films. "No" means that no odor was perceptible.

The results are reported in table 1.

The compositions labeled (Ref.) do not contain any inventive polyethers having blocked hydroxyl groups.

TABLE 1

Composition (in parts by weight) and properties of Z1 to Z5.

| Composition | Z1 | Z2 | Z3 | Z4 (Ref.) | Z5 (Ref.) |
|---|---|---|---|---|---|
| Polymer P1 | 28.00 | 28.00 | 28.00 | 28.00 | 28.00 |
| Aldimine-1 | 2.58 | 2.58 | 2.58 | 2.58 | 2.58 |
| Polyether-1 | 14.00 | — | — | — | — |
| Polyether-2 | — | 14.00 | — | — | — |
| Polyether-3 | — | — | 14.00 | — | — |
| DIDP [1] | — | — | — | 14.00 | — |
| DINCH [2] | — | — | — | — | 14.00 |
| Thixotropic agent | T-1 | T-2 | T-1 | T-3 | T-4 |
|  | 20.00 | 20.00 | 20.00 | 20.00 | 20.00 |
| Chalk [3] | 33.89 | 33.89 | 33.89 | 33.89 | 33.89 |
| Salicylic acid solution [4] | 1.50 | 1.50 | 1.50 | 1.50 | 1.50 |
| Dibutyltin dilaurate | 0.03 | 0.03 | 0.03 | 0.03 | 0.03 |
| ST [min] | 25 | 25 | 25 | 25 | 25 |
| Shore A | 10 | 16 | 14 | 15 | 15 |
| Tensile strength [MPa] | 1.14 | 1.37 | n.d. | 1.29 | 1.10 |
| Elongation at break [%] | 809 | 784 | n.d. | 918 | 840 |
| Modulus of elasticity 5% | 0.52 | 0.54 | n.d. | 0.86 | 0.73 |
| Modulus of elasticity 25% | 0.26 | 0.45 | n.d. | 0.47 | 0.55 |
| Appearance | nice | nice | nice | nice | nice |
| Odor | no | no | no | no | no |

"n.d." stands for "not determined"
[1] diisodecyl phthalate (Palatinol ® 10-P, from BASF SE)
[2] diisononyl cyclohexane-1,2-dicarboxylate (Hexamoll ® DINCH, from BASF SE)
[3] Omyacarb ® 5-GU (from Omya AG)
[4] 5% by weight in di(2-ethylhexyl) adipate Use of the Curable Compositions on Fresh Mortar:

Examples 1 to 5

Each of compositions Z1 to Z5, produced as described above, was applied to two of the fresh (green) mortar prisms prepared as described above in a layer thickness of 2 mm over an area of 30×80 mm. The first prism coated in this way was stored in a closed aluminum can in an air circulation oven at 80° C. for 24 h, and then tested for odor development. These results are labeled "(1d 80° C.)". The second coated prism was stored in a closed aluminum can under standard climatic conditions for 7 days and then likewise tested for odor development. These results are labeled "(7d SCC)". Odor development was determined by cautiously opening the aluminum can under standard climatic conditions and immediately detecting any odor by smelling by nose in the headspace of the aluminum can and of the composition. "No" means that no odor was perceptible. "Mild" refers to a slight odor as is typical of the composition in the warm state as intrinsic odor. "Distinct" refers to a distinctly perceptible musty odor. "Strong" refers to a strong musty odor.

The results are reported in table 2.

The examples labeled (Ref.) are comparative examples.

TABLE 2

Properties (odor formation) of compositions Z1 to Z5 on fresh (green) mortar.

| Example | 1 | 2 | 3 | 4 (Ref.) | 5 (Ref.) |
|---|---|---|---|---|---|
| Composition | Z1 | Z2 | Z3 | Z4 | Z5 |
| Odor formation |  |  |  |  |  |
| (7 d SCC) | no | no | no | distinct | distinct |
| (1 d 80° C.) | mild | mild | mild | strong | strong |

The invention claimed is:

1. A method comprising: contacting a curable composition comprising at least one polyether having blocked hydroxyl groups as plasticizer with a surface of at least one alkaline substrate, the surface of the alkaline substrate being configured such that when the surface is wetted with water the pH of the water-wetted alkaline substrate surface is at least 10,
    wherein the at least one polyether having blocked hydroxyl groups is derived from at least one hydroxy-functional polyether selected from the group consisting of polyoxypropylene diols having an OH number in the range from 12 to 155 mg KOH/g and the blocked hydroxyl groups are both acetate groups, and
    the curable composition comprises at least one polymer containing isocyanate and/or silane groups.

2. The method as claimed in claim 1, wherein the alkaline substrate is a fresh concrete, fresh cement mortar, fresh lime mortar or a fresh lime or silicate paint.

3. The method as claimed in claim 1, wherein the polyether having blocked hydroxyl groups has an average molecular weight $M_n$ in the range from 600 to 10,000 g/mol, determined by means of gel permeation chromatography (GPC) versus polystyrene as standard with tetrahydrofuran as mobile phase, refractive index detector and evaluation from 200 g/mol.

4. The method as claimed in claim 1, wherein the curable composition comprises at least one polymer containing isocyanate groups and at least one latent curing agent.

5. The method as claimed in claim 1, wherein the curable composition comprises at least one filler based on calcium carbonate.

6. The method as claimed in claim 1, wherein the curable composition comprises:
    10% to 50% by weight of polymer containing isocyanate and/or silane groups,
    20% to 60% by weight of fillers, and
    10% to 40% by weight of polyether having blocked hydroxyl groups.

7. A method of bonding or sealing or coating, comprising the steps of:
    (i) providing a curable composition, the curable composition comprising at least one polyether having blocked hydroxyl groups as plasticizer, wherein the at least one polyether having blocked hydroxyl groups is derived from at least one hydroxy-functional polyether selected from the group consisting of polyoxypropylene diols having an OH number in the range from 12 to 155 mg KOH/g and the blocked hydroxyl groups are both acetate groups, and
    (ii) providing at least one alkaline substrate, the surface of the alkaline substrate being configured such that when the surface is wetted with water the pH of the water-wetted alkaline substrate surface is at least 10,
    (iii) contacting the curable composition with the alkaline substrate, and
    (iv) curing the composition to form a cured composition, wherein
    the curable composition comprises at least one polymer containing isocyanate and/or silane groups.

8. An article obtained from the method as claimed in claim 7.

9. The article as claimed in claim 8, wherein the article is a parquet floor that has been bonded to a screed of concrete or cement mortar.

10. An adhesive bond obtained from the method as claimed in claim 1, the adhesive bond comprising a cured form of the curable composition and at least one substrate having a surface that is adhered to the cured form of the curable composition, wherein the surface of the at least one substrate is configured such that
- it was alkaline at the time of contacting the curable composition, and
- when the surface of the at least one substrate is wetted with water the pH of the water-wetted substrate surface is at least 10.

11. An adhesive bond obtained from the method as claimed in claim 7, the adhesive bond comprising the cured composition and at least one substrate having a surface that adheres to the cured composition, wherein the surface of the at least one substrate is configured such that
- it was alkaline at the time of contacting the curable composition, and
- when the surface of the at least one substrate is wetted with water the pH of the water-wetted substrate surface is at least 10.

12. The method as claimed in claim 1, wherein the curable composition is configured as a one-component moisture-curing composition.

13. The method as claimed in claim 7, wherein the curable composition is configured as a one-component moisture-curing composition.

* * * * *